US007258731B2

(12) United States Patent
D'Urso et al.

(10) Patent No.: US 7,258,731 B2
(45) Date of Patent: Aug. 21, 2007

(54) COMPOSITE, NANOSTRUCTURED, SUPER-HYDROPHOBIC MATERIAL

(75) Inventors: Brian R. D'Urso, Clinton, TN (US); John T. Simpson, Clinton, TN (US)

(73) Assignee: UT Battelle, LLC, Oak Ridge, TN (US)

( * ) Notice: Subject to any disclaimer, the term of this patent is extended or adjusted under 35 U.S.C. 154(b) by 226 days.

(21) Appl. No.: 10/900,249

(22) Filed: Jul. 27, 2004

(65) Prior Publication Data
US 2006/0024508 A1 Feb. 2, 2006

(51) Int. Cl.
*B44C 1/22* (2006.01)
*B32B 5/18* (2006.01)
(52) U.S. Cl. .......................... 106/2; 428/142; 428/144; 428/306.6; 428/323; 428/410; 428/426; 428/309.9; 216/41
(58) Field of Classification Search ................ 428/687, 428/612, 409, 410, 426, 432, 421, 457, 309.9, 428/306.6, 144, 142, 323; 106/2; 427/212–222
See application file for complete search history.

(56) References Cited

U.S. PATENT DOCUMENTS

| 2002/0142150 A1* | 10/2002 | Baumann et al. ........... 428/328 |
| 2002/0149584 A1 | 10/2002 | Simpson et al. |
| 2002/0150726 A1 | 10/2002 | Nun et al. |
| 2002/0151245 A1 | 10/2002 | Hoffman et al. |
| 2003/0013795 A1* | 1/2003 | Nun et al. ................... 524/442 |

FOREIGN PATENT DOCUMENTS

WO 02-098562 12/2002
WO PCT/US2005/026569 2/2005
WO PCT/2005/118501 12/2005

OTHER PUBLICATIONS

Translation of DE-10138036.*
S. A. McAuley, et al., "Silicon Micromachining Using a High-Density Plasma Source," Institute of Physics Publishing, 2001, pp. 2769-2774, vol. 34.
E. A. Litvinova, "Tunable Superhydrophobic Surfaces Fabricated by Nanosphere Lithography," MRS Bulletin, 2004, pp. 229-230.
J. Kim, et al., "Nanostrucutred Surfaces for Dramatic Reduction of Flow Resistance in Droplet-Based Microfluidics," IEEE, 2002, pp. 479-482.
T. N. Krupenkin, et al., "From Rolling Ball to Complete Wetting: They Dynamic Tuning of Liquids on Nanostrucutred Surfaces," Langmuir, 2004, pp. 3824-3827, vol. 20.
R. J. Tonucci, et al., "Nanochannel Array Glass," Science, 1992, pp. 783-785, vol. 258.
H. Y. Erbil, et al., Transformation of a Simple Plastic into a Superhydrophobic Surface, Science, 2003, pp. 1377-1380, vol. 299.
Oles, et al., Translation DE 10138036.

* cited by examiner

*Primary Examiner*—Jennifer McNeil
*Assistant Examiner*—Aaron Austin
(74) *Attorney, Agent, or Firm*—Akerman Senterfitt; Neil R. Jetter (57) ABSTRACT

A hydrophobic disordered composite material having a protrusive surface feature includes a recessive phase and a protrusive phase, the recessive phase having a higher susceptibility to a preselected etchant than the protrusive phase, the composite material having an etched surface wherein the protrusive phase protrudes from the surface to form a protrusive surface feature, the protrusive feature being hydrophobic.

10 Claims, 5 Drawing Sheets

COMPOSITE, NANOSTRUCTURED, SUPER-HYDROPHOBIC MATERIAL

The United States Government has rights in this invention pursuant to contract no. DE-AC05-00OR22725 between the United States Department of Energy and UT-Battelle, LLC.

CROSS-REFERENCE TO RELATED APPLICATION

This patent application is related to another patent application by D'Urso and Simpson entitled "Composite, Ordered Material Having Sharp Surface Features" and filed on even date herewith, the entire disclosure of which is incorporated herein by reference.

FIELD OF THE INVENTION

The present invention relates to composite super-hydrophobic materials, and more particularly to differentially etched, super-hydrophobic materials

BACKGROUND OF THE INVENTION

Hydrophobic surfaces bind very weakly with water, which makes drops of water "bead up" on the surface. A hydrophobic surface is generally defined and defined herein as that which has a contact angle greater than 90° with a drop of water. Hydrophobic materials include many well known, commercially available polymers.

A super-hydrophobic surface is generally defined and defined herein as that which has a contact angle greater than 150° with a drop of water. The lotus leaf surface is known to be naturally super-hydrophobic due to the texture of its waxy surface.

New materials are and methods are being sought that provide capability for making protrusive-featured surfaces that are especially suitable for super-hydrophobic applications.

OBJECTS OF THE INVENTION

Accordingly, objects of the present invention include: the provision of a composite, differentially etched, super-hydrophobic material. Further and other objects of the present invention will become apparent from the description contained herein.

SUMMARY OF THE INVENTION

In accordance with one aspect of the present invention, the foregoing and other objects are achieved by a hydrophobic disordered composite material having a protrusive surface feature including a recessive phase and a protrusive phase, the recessive phase having a higher susceptibility to a preselected etchant than the protrusive phase, the composite material having an etched surface wherein the protrusive phase protrudes from the surface to form a protrusive surface feature, the protrusive feature being hydrophobic.

In accordance with another aspect of the present invention, a composite material having sharp surface features includes a recessive phase and a protrusive phase, the recessive phase having a higher susceptibility to a preselected etchant than the protrusive phase, the composite material having an etched surface wherein the protrusive phase protrudes from the surface to form a sharp surface feature, at least one of the protrusive phase and the recessive phase further including a disordered composite material having a protrusive surface sub-feature including a sub-recessive phase and a sub-protrusive phase, the sub-recessive phase having a higher susceptibility to a preselected etchant than the sub-protrusive phase, the composite material having an etched surface wherein the sub-protrusive phase protrudes from the surface to form a protrusive surface sub-feature.

In accordance with a further aspect of the present invention, a hydrophobic disordered composite material having a protrusive surface feature includes a recessive phase and a protrusive phase, the recessive phase having a higher susceptibility to a preselected etchant than the protrusive phase, the recessive phase and the protrusive phase being contiguous and interpenetrating, the composite material having an etched surface wherein the protrusive phase protrudes from the surface to form a protrusive surface feature, the protrusive feature being hydrophobic.

In accordance with another aspect of the present invention, a composite material having sharp surface features includes a recessive phase and a protrusive phase, the recessive phase having a higher susceptibility to a preselected etchant than the protrusive phase, the composite material having an etched surface wherein the protrusive phase protrudes from the surface to form a sharp surface feature, at least one of the protrusive phase and the recessive phase further including a disordered composite material having a protrusive surface sub-feature including a sub-recessive phase and a sub-protrusive phase, the sub-recessive phase having a higher susceptibility to a preselected etchant than the sub-protrusive phase, the sub-recessive phase and the sub-protrusive phase being contiguous and interpenetrating, the composite material having an etched surface wherein the sub-protrusive phase protrudes from the surface to form a protrusive surface sub-feature.

In accordance with a further aspect of the present invention, a method of making a hydrophobic, disordered composite material having a protrusive surface feature comprising the steps of: making a disordered composite body comprised of a recessive phase and a protrusive phase, said recessive phase having a higher susceptibility to a preselected etchant than said protrusive phase; treating a surface of said composite body with said preselected etchant so that said protrusive phase protrudes from said surface to form a protrusive surface feature; and applying a hydrophobic coating to said protrusive surface feature.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention is based upon a composite structure including a recessive phase material and a protrusive phase material. The respective phases provide differential etchability/solubility, the recessive phase having a greater etchability/solubility than the protrusive phase. By subjecting the surface of the composite structure to an etchant/solvent that removes more of the recessive phase than the protrusive phase, some of the protrusive phase forms a nanostructured surface comprised of a protrusive surface feature such as, for example, spikes and/or ridges and/or roughness.

The protrusive phase is often sharpened because even the protrusive phase is etched in the process, just more slowly than the recessive phase. The phrase "sharp surface feature" is defined herein to mean a generally tapered, protrusive structure that preferably terminates in a sharp terminus, ideally an atomically sharp point or ridge.

The use of any differentially etchable/soluble recessive and protrusive materials in any combination to produce the desired effect is considered to fall within the scope of the present invention. Moreover, there are no limits to the variations of sizes and shapes of the nanostructured surface. The composite base material may be made from any materials differentially etchable by any known etching method or methods.

The composite base material may be made from any materials which have suitable etching characteristics and phase separation characteristics as described hereinabove. Suitable materials include, for example, glasses, metals (including alloys), ceramics, polymers, resins, and the like. Choices of materials can have an effect on properties of the product, such as, for example, chemical resistance, ease and/or need of coating, strength, toughness, flexibility, elasticity, plasticity, etc.

One method for producing the composite base material starts with a "precursor" material comprised of at least two phases which are more miscible at a first temperature but less immiscible at a second temperature. In this case, the precursor material can be produced at an elevated temperature (where the phases are miscible) as a homogenous material (typically molten). Next, the precursor material is separated into two or more phases, at least one phase of which is recessive and at least one other phase of which is protrusive upon etching. The phase separation may take place while cooling the precursor material or by heat treating the precursor material to a temperature where the material is softer but the phases are immiscible. Phase separation via spinodal decomposition, which results in two contiguous phases, is one available mechanism, and nucleated decomposition is another mechanism for achieving phase separation. Following phase separation, the recessive phase and protrusive phase are often contiguous and interpenetrating.

The composite base material may also be produced by sintering or fusing at least two particulate, differentially etchable materials together. The materials must be differentially etchable, so that one material comprises the protrusive phase and another other material comprises the recessive phase.

The composite surface is etched to create a protrusive nanostructure of the protrusive phase at the surface. The composite surface is contacted with an etchant that etches the recessive phase faster than the protrusive phase. The etching continues until the recessive phase is etched back to the desired depth, leaving some of the protrusive phase protruding from the surface. The protrusive phase may also be etched in the process to form sharpened and/or rough features. The aspect ratio of the sharpened features or roughness is dependent on the ratio of the protrusive and recessive phase etching rates.

The etchant can be a "mixed etchant system" which is comprised of a mixture of a plurality of etchants that give different etch contrast ratios when applied to the composite surface. For example, one etchant can preferentially etch one phase while the other etchant can preferentially etch the other phase. A mixed etchant system can be particularly useful because the contrast ratio of the etching process can be modified by changing the composition and/or relative concentrations of the etchants. An example of a mixed etchant system is a mixture of HF and HCl. The possible compositions of suitable mixed etchant systems are virtually without limits.

Moreover, a plurality of etchants can be used in a series of two or more sequential etching steps. For example, HF is applied to the composite surface in a first etching step, rinsed away, and then HCl is applied to the composite surface in a second etching step. The possible combinations of suitable etchants and etching steps are virtually without limits.

The method by which the etching is carried out is not critical to the invention, as long as the desired surface feature is achieved. For example, other, non-solution etching techniques may be used, such as plasma etching or other isotropic etch techniques.

EXAMPLE I

Figure 1:
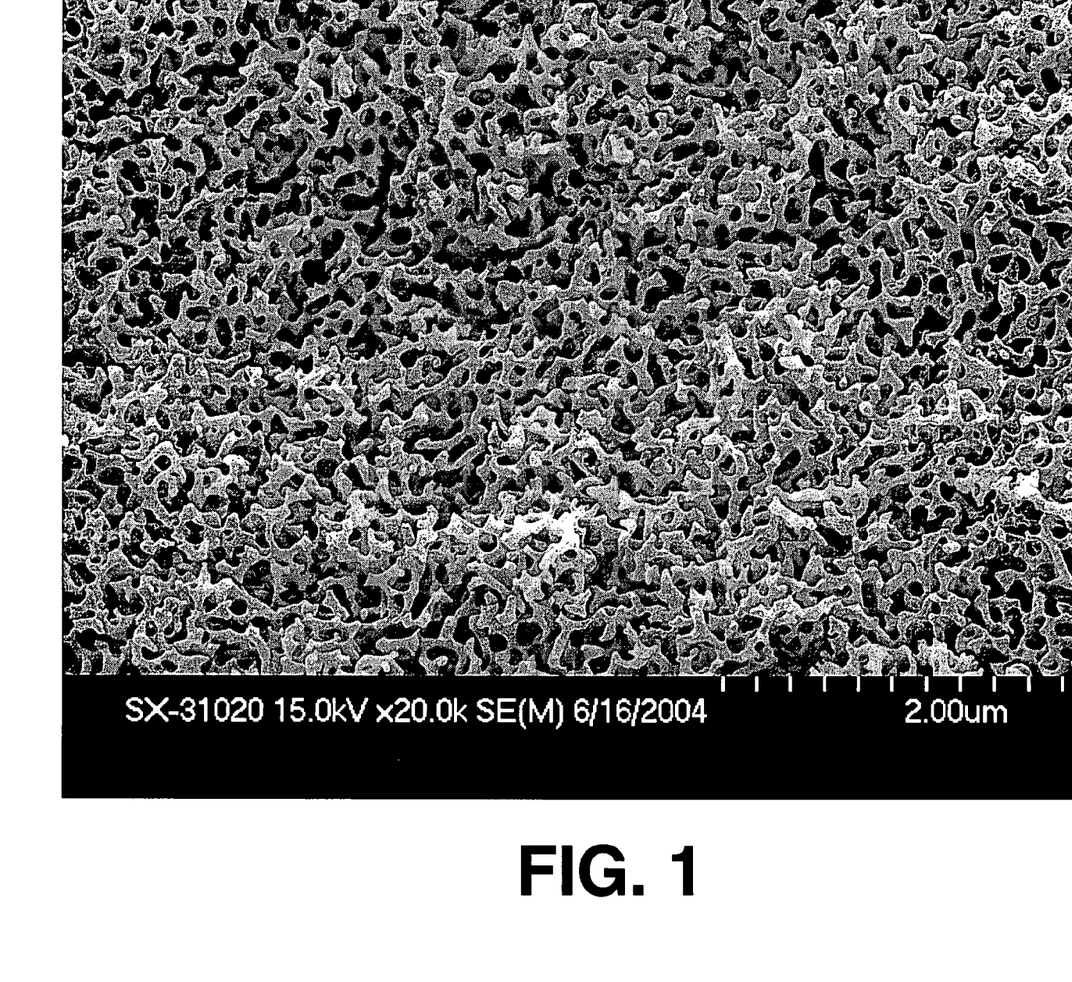
FIG. 1 is a photomicrograph of a composite glass having a differentially etched surface in accordance with the present invention.

In accordance with the present invention, sodium borosilicate glass comprising 65 molecular % $SiO_2$, 25 molecular % $B_2O_3$, and 10 molecular % $Na_2O$ was heat treated at 700° C. for 6 hours, resulting in phase separation via spinodal decomposition. The surface of the material was subsequently etched with an aqueous solution of HF, etching back the recessive phase and revealing the protrusive phase. The surface was then coated with a hydrophobic self-assembled monolayer by immersing the material in a solution of (tridecafluoro-1,1,2,2 tetrahydrooctyl) trichlorosilane in hexanes. The result was a super-hydrophobic, nanostructured composite, shown in FIG. 1.

At least the protrusive phase can be hydrophobic or treated to make the surface thereof hydrophobic, for example by coating. It is often advantageous but not necessary to make the recessive phase hydrophobic as well. It is the combination of the structure and hydrophobic material which can make the surface super-hydrophobic.

Coating may not be necessary if the protrusive phase or both phases are intrinsically hydrophobic. It can be particularly advantageous for a super-hydrophobic surface if the protrusive phase or both phases are fluorinated polymers, which are highly hydrophobic and do not generally require any hydrophobic coating.

To create a super-hydrophobic surface, the nanostructured surface may be coated with a hydrophobic material such as a fluorocarbon, for example. The hydrophobic coating may comprise, for example, a coating of PTFE or similar polymer; polymers having $CF_3$ terminal groups are especially suitable. The coating may be spin-coated (applied as a liquid while spinning the material) to obtain a uniform thickness (e.g. Dupont Teflon© AF may be applied in solution). It may also be deposited via a vacuum deposition process. For example, PTFE or other fluorocarbon may be applied by sputtering or hot filament chemical vapor deposition (HFCVD). A self-assembled monolayer is an especially simple and effective hydrophobic coating for various materials, including glass, as it can be applied by simply immersing the material in an appropriate solution, or by pouring or spraying it onto the surface, for example. The surface of a polymer may be fluorinated to make the surface more hydrophobic. Other coatings may be used to make the material hydrophobic and may depend on the materials used in the composite. The result is a nanostructured, coated, super-hydrophobic surface that repels water (including a variety of aqueous fluids).

Figure 2:
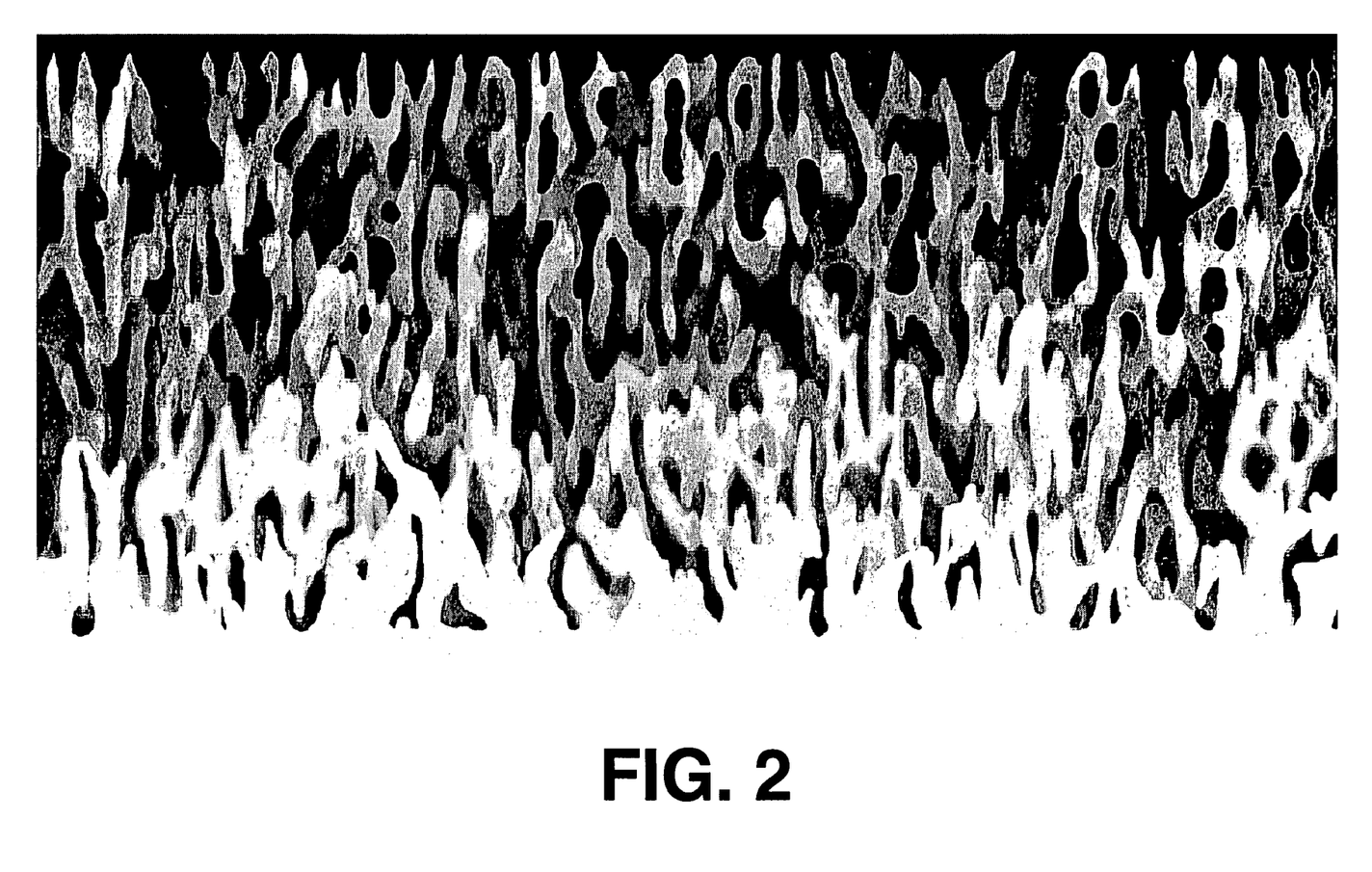
FIG. 2 is a representation of a composite glass having an elongated and differentially etched surface in accordance with the present invention.

The microstructure of the composite base material may be elongated by drawing or extruding during or after the separation or fusing of the two phases. This is preferably done such that the material is unidirectionally plastically deformed while maintaining the phase separation. The material is then cut perpendicular to the drawing direction and the cut surface is etched and coated as before. Elongation may improve the super-hydrophobic properties by increasing the sharpness of the surface features or by giving larger aspect ratio features. A computer-generated representation of the material in cross section is shown in FIG. 2. The choice of composite materials is particularly important if the material is to be elongated. If the two phases are excessively miscible, they may mix together during elongation and form a homogeneous mix. If the phases are insufficiently miscible, one may tend to break up into small spheres within the other (like oil in water). A suitable material system is sodium lithium borosilicate glasses, where the sodium to lithium ratio can be adjusted to tune the miscibility of the two phases.

Multi-stage heat treating can produce subsequent, smaller size phase separations in one or more of the phases of the material, resulting in a more complex nanostructure with smaller features.

The material can be reduced to particles (by crushing, for example) for coating and/or laminating a surface. Etching and/or application of a hydrophobic coating can be carried out either before or after application of the particles to a surface such as a watercraft hull or hydrofoil, for example.

The composite base material of the present invention may be used in combination as part of another, generally larger structure, particularly when the composite base material is made by spinodal decomposition. For example, a precursor composite can be used as at least one of the phases in an ordered system such as a spiked composite in accordance with the related invention referenced above. Phase separation is generally carried out before or after drawing, but before etching, resulting in a double-scaled structure where the recessive phase and/or the protrusive phase has a substructure comprising a sub-recessive phase and a sub-protrusive phase.

These double-scaled structures are characterized by surface sub-features comprising the nanostructure of the present invention, in combination with sharp surface features in accordance with the related invention referenced above. Such a combination can provide an even more highly super-hydrophobic material. The roughness of the features may be particularly helpful in preventing wetting of the super-hydrophobic material under elevated water pressure.

Figure 3:
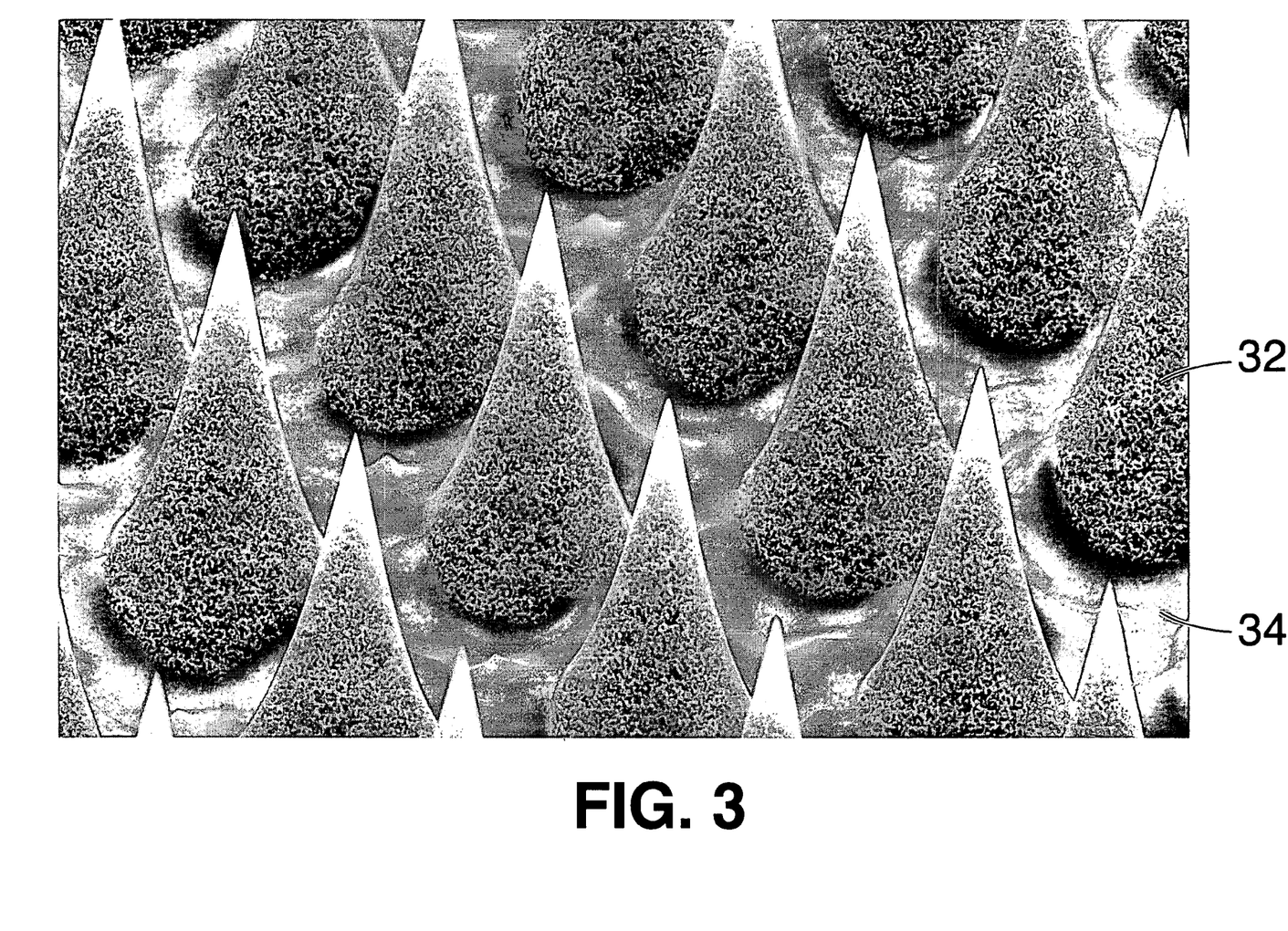
FIG. 3 is a representation of a spiked surface with roughened spikes in accordance with the present invention.

Referring to FIG. 3, a double-scaled structure can be used as the protrusive phase in an ordered system, resulting in a sharp surface feature (spike) 32 having a protrusive surface sub-feature (roughness of the spike) and a generally smooth recessive phase 34.

Figure 4:
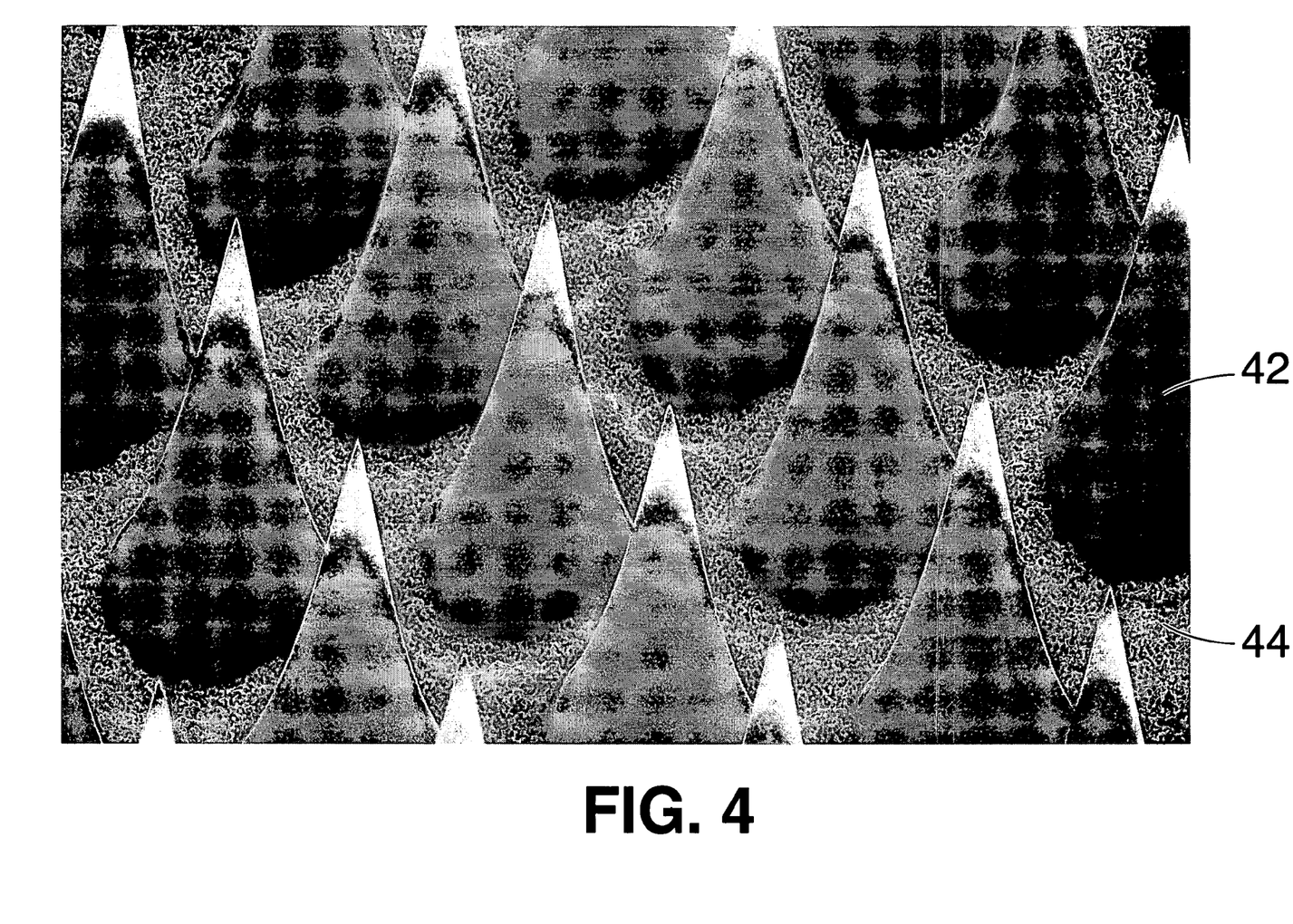
FIG. 4 is a representation of a spiked surface with a roughened base material in accordance with the present invention.

Moreover, a double-scaled structure can be used as the recessive phase in an ordered system. Referring to FIG. 4, the result is smooth sharp surface feature (spike) 42 and a recessive phase 44 having a protrusive surface sub-feature (roughness).

Figure 5:
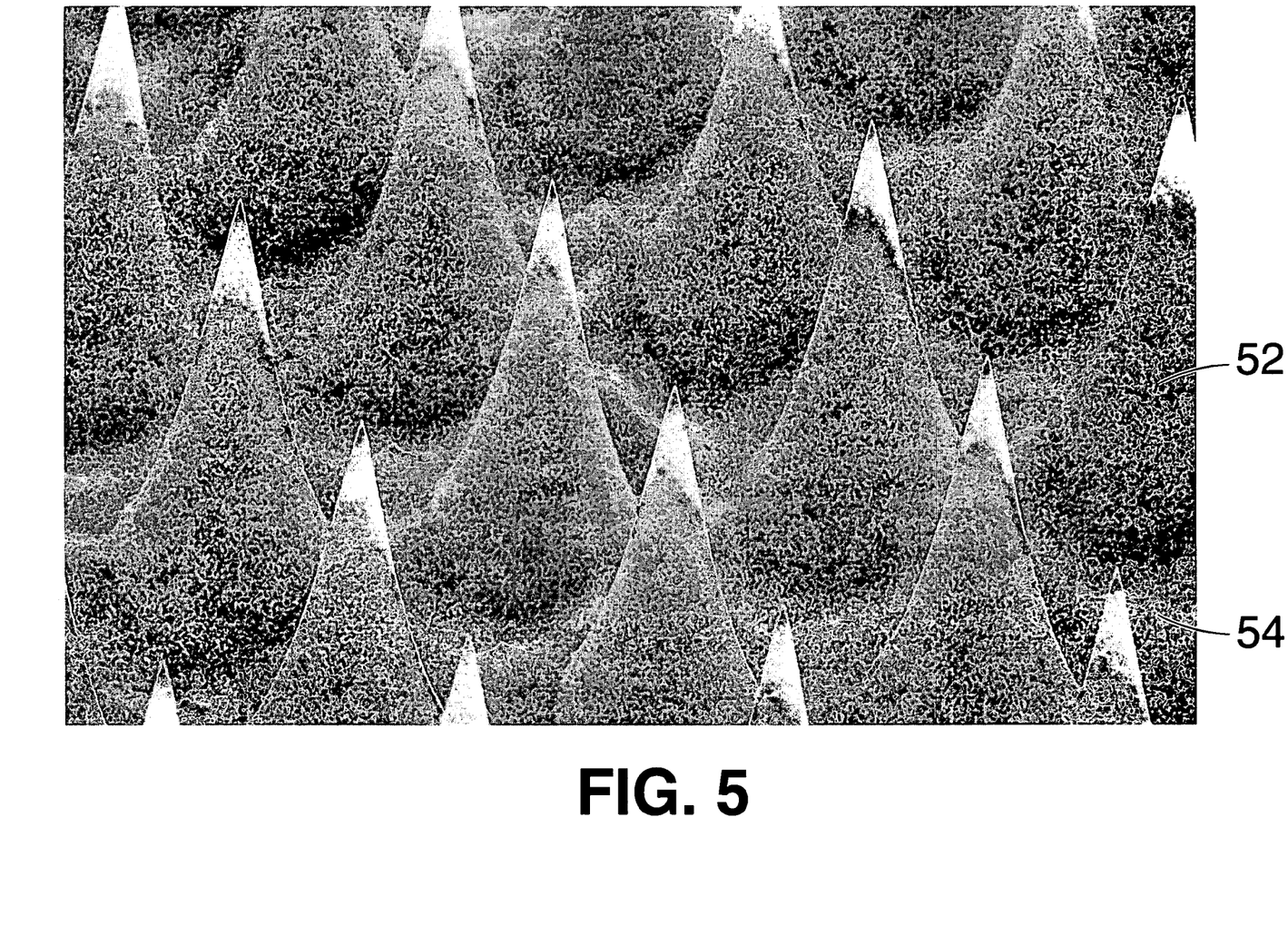
FIG. 5 is a representation of a spiked surface with roughened spikes and base material in accordance with the present invention.

Moreover, differentially etchable, double-scaled structures can be used as both the protrusive phase and recessive phase in an ordered system. Referring to FIG. 5, the result is rough sharp surface feature (spike) 52 having a protrusive surface sub-feature (roughness of the spike), and a recessive phase 54 also having a protrusive surface sub-feature (roughness).

EXAMPLE II

In accordance with the present invention, glass rods having a core glass composite comprising phase A and phase B as the protrusive phase and phase C and phase D cladding as the recessive phase are bundled, heated to a temperature sufficient to soften the rods, and drawn to reduce the diameter thereof. The resulting rod is cut into sections that are re-bundled and redrawn. The above process is repeated until the diameter of the core glass is reduced to 5 µm and spaced apart about 7 µm. The rod is cut into sections, bundled, and fused to form a shorter, thicker rod having a diameter of about 1.5 cm. The rod is heat treated at 700° C. for 6 hours, resulting in phase separation of phase A and phase B, and of phase C and phase D via spinodal decomposition. A thin plate is cut transversely from the end of the rod, polished, and subject to etching with HF at room temperature for a period of 20 min. to produce a double-scaled, nano-spiked, roughened surface on the disk as shown in FIG. 5. The nano-spikes are about 12 µm tall.

In Example II, the etchability of the composite of phase A and phase B is less than the etchability of the composite of phase C and phase D, the etchability of phase A is less than the etchability of phase B, and the etchability of phase C is less than the etchability of phase D.

In some embodiments of the present invention, the material is preferably produced in tiles for coating a surface. Tiles may be produced as thin slices of the composite material. Tiles can be bonded to various surfaces, for example, watercraft hulls. In order to apply the tiles to irregularly shaped surfaces, unetched tiles can be cut very thin and/or heated to make the tiles became flexible enough to mold to the irregular shape. Once the tiles acquired the proper shape they can then be bonded thereto, and processed (etched and optionally coated). Alternatively, the tiles may be processed first and then bonded to the desired surface.

The composite material may be used to coat a surface before decomposing into differentially etchable phases. The material may be evaporated, sputtered, melted on from a powder, plasma sprayed, attached as a powder with adhesive, etc. In some embodiments it may be preferable to coat a surface with the separated components of the composite simultaneously, forming the composite as a film. In either case, the material is then heat treated, etched, and coated to form a super-hydrophobic surface.

In some cases it is advantageous to etch away most or all of the recessive phase to produce a porous structure that can be used, for example, as a filter, for removal of dissolved gases from various aqueous fluids, and for pressurization of a surface gas layer in various aqueous fluids.

The nanostructured surface can be easily regenerated if it has been damaged. Generally, all that is required is stripping off of the old hydrophobic coating (if necessary), re-etching of the surface to regenerate the sharp or rough features, and reapplication of the hydrophobic coating (if necessary). The base material (composite) contains the composite pattern through its thickness, and does not need to be replaced unless it is completely etched away. This is a great advantage since the tiny sharp or rough features may be damaged by scraping.

Some advantages of the above described embodiments of the invention include:

1. Materials used in the construction of the surface can be mostly inert or at least non-reactive.
2. Simple acids and/or solvents can be used for the etching step.
3. Scaled-up production to large quantities of material is simple and straightforward in most cases.
4. Nanostructured surface features can be regenerated in-situ quickly and inexpensively if needed.

Applications of the present invention, particularly the super-hydrophobic embodiments thereof, include, but are not limited to the following By using a super-hydrophobic, porous structure as described above, the present invention can be used as a dissolved gas extractor/monitor. The material has a strong resistance to water penetration or even wetting. As pressure or vacuum is used to force water against the material (generally at ambient temperature), the increased energy applied to the liquid becomes sufficient to effect localized, microscopic boiling (vaporization) of the liquid. Any dissolved gases can easily pass through the structure, but not water. The present invention thus provides means of removing and/or sampling for dissolved hazardous gasses (for example, poisonous chemical and/or biological agents) from the water, acting as a filter that is permeable to dissolved gases but impermeable to water. This particular application of the present invention is especially applicable to Homeland Security and the ongoing effort to counter terrorism.

Use of the present invention on watercraft hulls, hydrofoils, and the like significantly reduces frictional drag through water, allowing higher speeds and/or longer range of travel using the same amount of power. The coating/laminate can also be used to reduce the disturbance or wake (i.e. signature) left in the water by the craft. The coating/laminate may be used to reduce or eliminate fouling of hulls by barnacles, dirt, and the like. The coating/laminate can also be used to greatly reduce the corrosive effects of salt water. Thus, the coating/laminate will be advantageous for virtually any water vehicle or device including small water craft, surface ships, submarines, torpedoes, unmanned surface or underwater craft and ocean gliders.

The present invention can be used on moving parts and stators of propellers, turbines, rudders, steering planes, and the like to reduce drag and cavitations, improving the efficiency thereof.

The present invention can be used to make glassware for hazardous and/or precious liquid manipulation. When poured out of glassware made of or coated with the material water and other water based solutions leave no residue and are completed removed from the glassware. An advantage is the elimination of contamination between experiments.

The present invention can be used to make self cleaning glassware, windows, lenses, and the like. The super-hydrophobic material does not leave any residue, but as water and many aqueous solutions roll off the surface, most dust or dirt encountered may be wetted and swept away, thus making the material self cleaning.

The present invention can be used as an anti-condensation appliance. When water vapor condenses on the surface the droplets move to the tips of the nanostructures and roll off the surface very easily. This rolling off generally occurs at the micron to sub-micron level, before any visible appearance of surface fog or frost. Buildup of moisture or ice is eliminated. Applications include, but are not limited to transparent appliances such as, for example, eye glasses, safety goggles, masks, windshields, windows, and the like. The ability of the structured material to be transparent is governed by the laws of optical diffraction. Simply put, when the nanostructure size is much less than an optical wavelength, the structure will appear transparent. Moreover, applications include, but are not limited to heat exchangers such as, for example, refrigerators, heat pumps, dehumidifier cooling coils, and the like, thus increasing their energy efficiencies and decreasing or even eliminating the need for a defrost cycle.

The present invention can be used to coat airplane wings, propellers, and the like to keep freezing rain from sticking or accumulating. Such a coating is anti-icing because before water droplets can form ice they drop off the surface.

The present invention can be used as a medium for crystallization. When a water based solution resides on the surface it forms a spherical droplet. When the droplet is allowed to evaporate it will uniformly shrink without pinning to the surface (pinning causes a "coffee stain" ring on most other surfaces). This may be particularly useful for crystallizing ultra-pure proteins, similar to what has been carried out in a micro-gravity environment.

The present invention can be used as a coating for conduits such as pipes, tubing, hoses, and the like, for example. The reduction in viscous drag greatly reduces or eliminates the shearing forces normally associated with laminar flow and turbulence through the conduit. This will cause the entire volume of water to move as a unit with little or no turbulence and thus greatly reduce the amount of energy required to force the fluid therethrough. This is especially true for convection circulation systems where the driving force is weak. The surface properties may also change the conditions under which the flow is turbulent. Since water is in minimal contact with the surface, thermal contact is also decreased, reducing thermal losses of heated and cooled aqueous fluids, and enabling management thereof by strategically locating the coating in the pipes.

The present invention can be used to separate liquids which are immiscible, for example water and oil. The super-hydrophobic material attracts oil and other organic liquids.

With selection of a suitable sharp surface feature and surface properties, the present invention can be used as an anti-clotting surface for blood, which generally will not stick to the surface. Thus, the material prevents blood from clotting thereon, and can be used as a coating for synthetic implants, such as stents, heart valves, artificial heart surfaces, surgical instruments, and for external machines used to circulate blood. The decreased viscous drag on the surface may reduce the shear force on the blood, reducing damage to the blood.

An electrically conductive substrate can be coated with super-hydrophobic material of the present invention. The super-hydrophobic properties can be electrically switched on and off, for example by electro-wetting on dielectric (EWOD) or with an electrically switchable surface coating.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. An article having a hydrophobic surface, comprising:
   a composite base material comprising a first material and at least a second material different from said first material, wherein said first material is contiguous and said second material is contiguous, said first and second material forming an interpenetrating structure, and
   a plurality of spaced apart nanostructured surface features comprising said second material protruding from a surface of said interpenetrating structure, wherein said second material comprises a hydrophobic material or said surface features are coated with a hydrophobic coating layer.

2. The article of claim 1, wherein said features consist essentially of said second material.

3. The article of claim 1, wherein at least one of said first and second material comprises a glass, metal, ceramic, polymer or a resin.

4. The article of claim 1, wherein said hydrophobic coating layer comprises at least one fluorocarbon polymer.

5. The article of claim 1, wherein said features are tapered features.

6. The article of claim 5, wherein said tapered features include sharp surface features.

7. The article of claim 1, wherein said article provides a super-hydrophobic surface.

8. The article of claim 1, wherein said article is a porous article.

9. The article of claim 1, further comprising a substrate, wherein said base material is disposed on said substrate.

10. The article of claim 9, wherein said substrate comprises an electrically conductive substrate.

* * * * *